(12) United States Patent
Chang

(10) Patent No.: US 10,555,549 B2
(45) Date of Patent: Feb. 11, 2020

(54) ROASTING DRUM OF ROASTER

(71) Applicant: Wen-Fang Chang, Taichung (TW)

(72) Inventor: Wen-Fang Chang, Taichung (TW)

( * ) Notice: Subject to any disclaimer, the term of this patent is extended or adjusted under 35 U.S.C. 154(b) by 250 days.

(21) Appl. No.: 15/587,250

(22) Filed: May 4, 2017

(65) Prior Publication Data
US 2018/0317538 A1 Nov. 8, 2018

(51) Int. Cl.
*A23N 12/08* (2006.01)
*A23N 12/10* (2006.01)
*B01F 9/00* (2006.01)

(52) U.S. Cl.
CPC .......... *A23N 12/083* (2013.01); *A23N 12/10* (2013.01); *B01F 2009/0083* (2013.01); *B01F 2215/0014* (2013.01)

(58) Field of Classification Search
CPC ..... A23N 12/083; A23N 12/10; B01F 9/0009; B01F 9/0012; B01F 2009/0083
See application file for complete search history.

(56) References Cited

U.S. PATENT DOCUMENTS

| | | | | |
|---|---|---|---|---|
| 2,112,848 A | * | 4/1938 | Jackson | B01F 9/0009 366/135 |
| 2,301,922 A | * | 11/1942 | Atti | A23N 12/10 34/108 |
| 2,360,838 A | * | 10/1944 | Atti | A23N 12/10 34/128 |
| 4,924,765 A | * | 5/1990 | Pera | A23N 12/10 34/109 |
| 4,958,443 A | * | 9/1990 | Haueter | A21C 9/00 34/130 |
| 5,287,633 A | * | 2/1994 | Sachs | A23N 12/10 34/135 |

FOREIGN PATENT DOCUMENTS

| | | |
|---|---|---|
| TW | M376162 | 9/2009 |
| TW | M477166 | 1/2014 |
| TW | M527217 | 4/2016 |

* cited by examiner

*Primary Examiner* — Kevin F Murphy
(74) *Attorney, Agent, or Firm* — Sinorica, LLC

(57) ABSTRACT

A roasting drum has a main body and at least one opening formed through the main body. The main body has a first end, a second end opposite the first end, and multiple drums. The multiple drums are mounted around one another in sequence, are fastened to one another, and communicate with one another. Each one of the multiple drums has a blending blade formed on an inner surface of the drum. The blending blade is spiral and extends from the first end toward the second end. The blending blade of one of the multiple drums twists along a clockwise direction from the first end toward the second end. The blending blade of another one of the multiple drums that is mounted around the drum twists along a counter-clockwise direction from the first end toward the second end.

6 Claims, 6 Drawing Sheets

ROASTING DRUM OF ROASTER

BACKGROUND OF THE INVENTION

1. Field of the Invention

The present invention relates to a component of a roaster, and more particularly to a roasting drum with multiple drums mounted around each other in sequence for evenly roasting heated goods such as coffee beans, chestnuts, peanuts, sesame seeds, and almonds, etc.

2. Description of Related Art

Roasters are heating devices utilized for roasting heated goods such as coffee beans, chestnuts, grains, etc. For roasting goods evenly, a conventional roaster has an inner drum, and the inner drum has multiple blending sheets or a spiral sheet formed inside the inner drum. The inner drum rotates constantly as the roaster is operating. The coffee beans are repeatedly stirred by the blending sheets or the spiral sheet of the inner drum.

For example, Taiwan Utility Model Patent No. M376162 has disclosed a roaster having a spiral blending sheet formed on an inner surface of an inner drum, and the inner drum is disposed obliquely. Coffee beans inside the inner drum are repeatedly stirred by the spiral blending.

Taiwan Utility Model Patent No. M477166 has disclosed an additional roaster with a spiral blending sheet is formed on an inner surface of a rotating drum. The rotating drum is driven by a driving assembly and repeatedly rotates clockwise and counter-clockwise to make coffee beans inside the rotating drum continuously stirred.

Taiwan Utility Model Patent No. M527217 has disclosed another conventional roaster having a spiral blending assembly. The spiral blending assembly is fastened on an inner surface of a rotating drum. The spiral blending assembly has a pair of spiral blending sheets with two opposite twisting directions. Each one of the two spiral blending sheets is fastened with multiple far-infrared ceramic plates for emitting far infrared rays to heat coffee beans. The rotating drum rotates, and coffee beans inside the rotating drum are stirred by the two spiral blending sheets with opposite twisting directions and are heated evenly.

Each one of the conventional roasters equipped with at least one spiral blending sheet just has one single rotating drum. Therefore, only coffee beans disposed at a bottom of the rotating drum are stirred by the at least one spiral blending sheet. Or only a portion of the heated goods is continuously stirred, and tastes and qualities of the heated goods are affected.

To overcome the shortcomings of the conventional roaster with one single rotating drum, the present invention provides a roasting drum of a roaster to mitigate or obviate the aforementioned problems.

SUMMARY OF THE INVENTION

The main objective of the present invention is to provide a roasting drum for stirring heated goods sufficiently and roasting the heated goods evenly.

The roasting drum comprises a main body and at least one opening formed through the main body. The main body has a first end, a second end opposite the first end, and multiple drums. The multiple drums are mounted around each other in sequence, are fastened to one another, and communicate with one another. Each one of the multiple drums has a blending blade formed on an inner surface of each one of the multiple drums. The blending blade is spiral and extends from the first end toward the second end. The blending blade of one of the multiple drums twists along a clockwise direction from the first end toward the second end. The blending blade of another one of the multiple drums within said drum twists along a counter-clockwise direction from the first end toward the second end.

The roasting drum in accordance with the present invention blends and stirs coffee beans sufficiently for promoting quality of roasting and taste of the coffee beans.

Other objects, advantages, and novel features of the invention will become more apparent from the following detailed description when taken in conjunction with the accompanying drawings.

DETAILED DESCRIPTION OF PREFERRED EMBODIMENT

A roasting drum in accordance with the present invention is assembled on roasters applied for roasting heated goods such as coffee beans, chestnuts, peanuts, sesame seeds, and almonds, etc.

Figure 1:
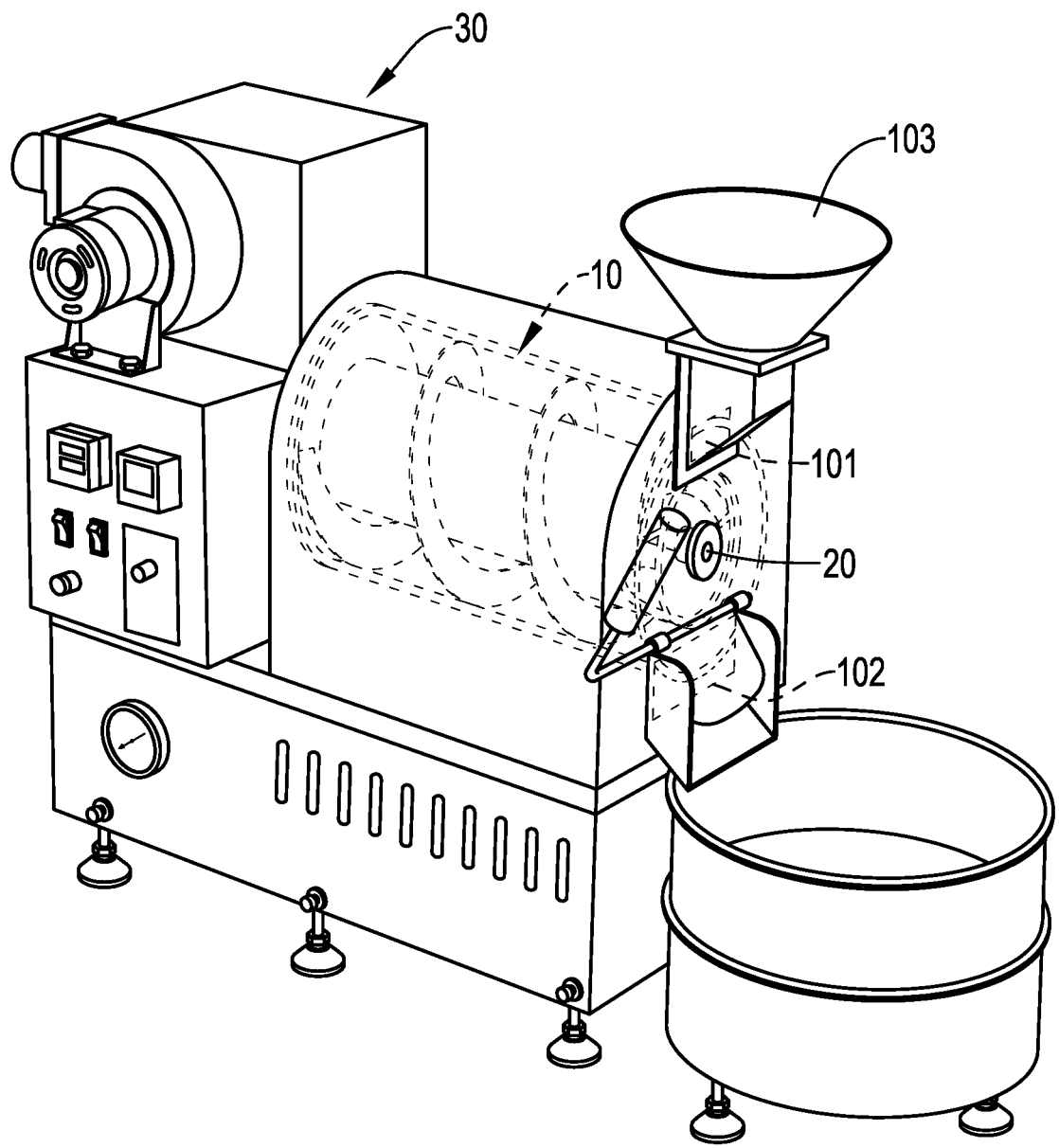
FIG. 1 is a perspective view of a roaster equipped with a roasting drum in accordance with the present invention.
Figure 2:
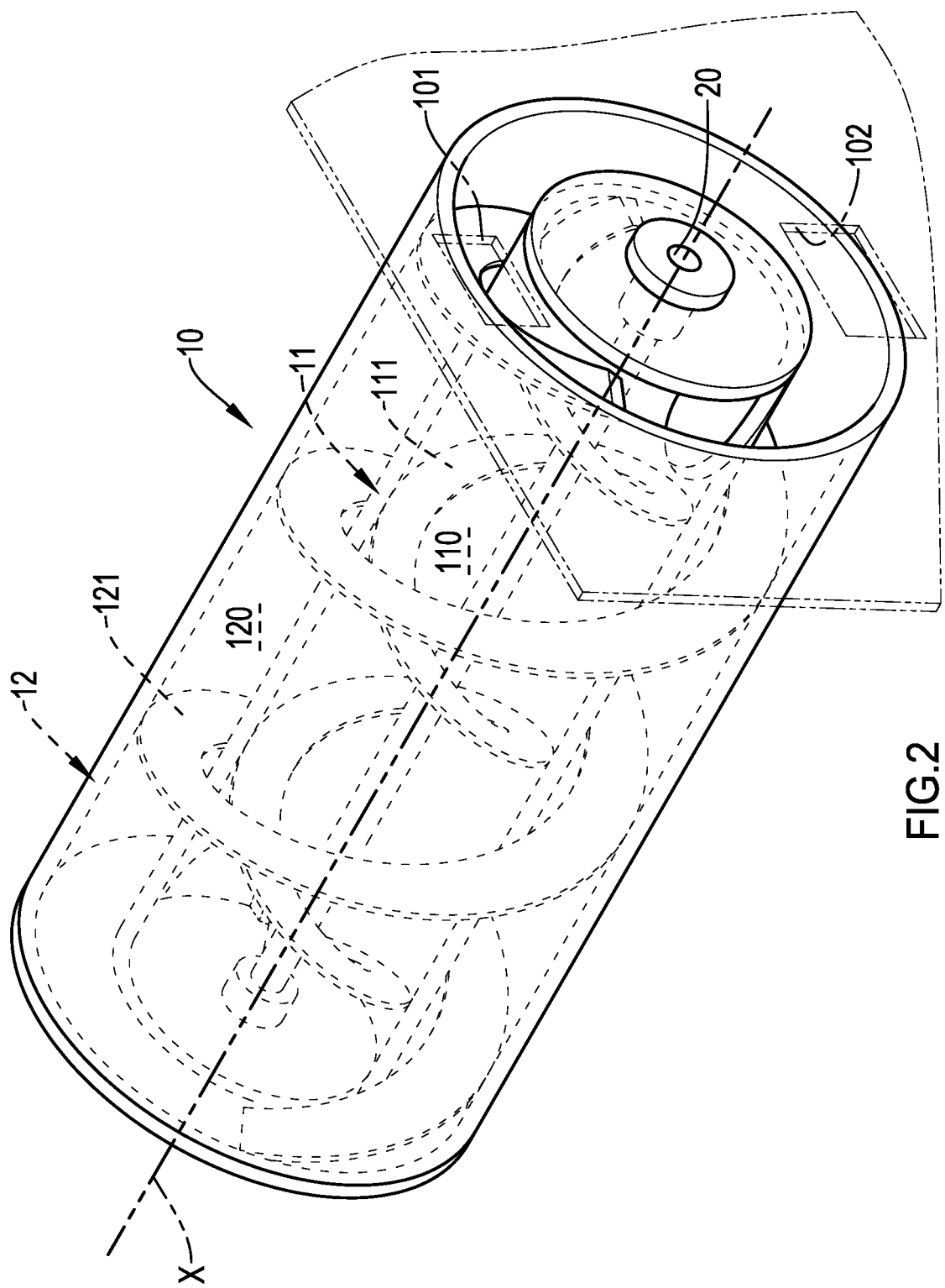
FIG. 2 is an enlarged perspective view of the roasting drum in FIG. 1.

With reference to FIGS. 1 and 2, a roaster has a main body 10, a shaft 20, and a driving device 30. The main body 10 has a rotating axis X, a first end, a second end, multiple drums, and at least one opening. The first end and the second end of the main body 10 are closed and are disposed opposite each other along the rotating axis X of the main body 10. The multiple drums are disposed along the rotating axis X of the main body 10, are mounted around one another in sequence, are fastened to one another, and communicate with one another. That is, except an outermost drum and an innermost drum of the multiple drums, each one of the rest of the multiple drums is disposed inside another one of the rest of the multiple drums. The multiple drums are able to rotate together. Each one of the multiple drums has an inner surface and a blending blade formed on the inner surface of the drum, being spiral, and extending from the first end of the main body 10 toward the second end of the main body 10.

The blending blade of one of the multiple drums spirally extends along a clockwise direction from the first end of the main body 10 toward the second end of the main body 10. The blending blade of another one of the multiple drums within said drum spirally extends along a counter-clockwise direction from the first end of the main body 10 toward the second end of the main body 10. The at least one opening may be implemented as two in amount. The two openings are designed for passing of the heated goods such as coffee beans, chestnuts, and grains, etc. The two openings are an inlet 101 and an outlet 102 communicating with at least one of the multiple drums. The inlet 101 and the outlet 102 may be both formed through the first end of the main body 10. The inlet 101 and the outlet 102 may also be respectively formed through the first end and the second end of the main body 10.

Figure 3:
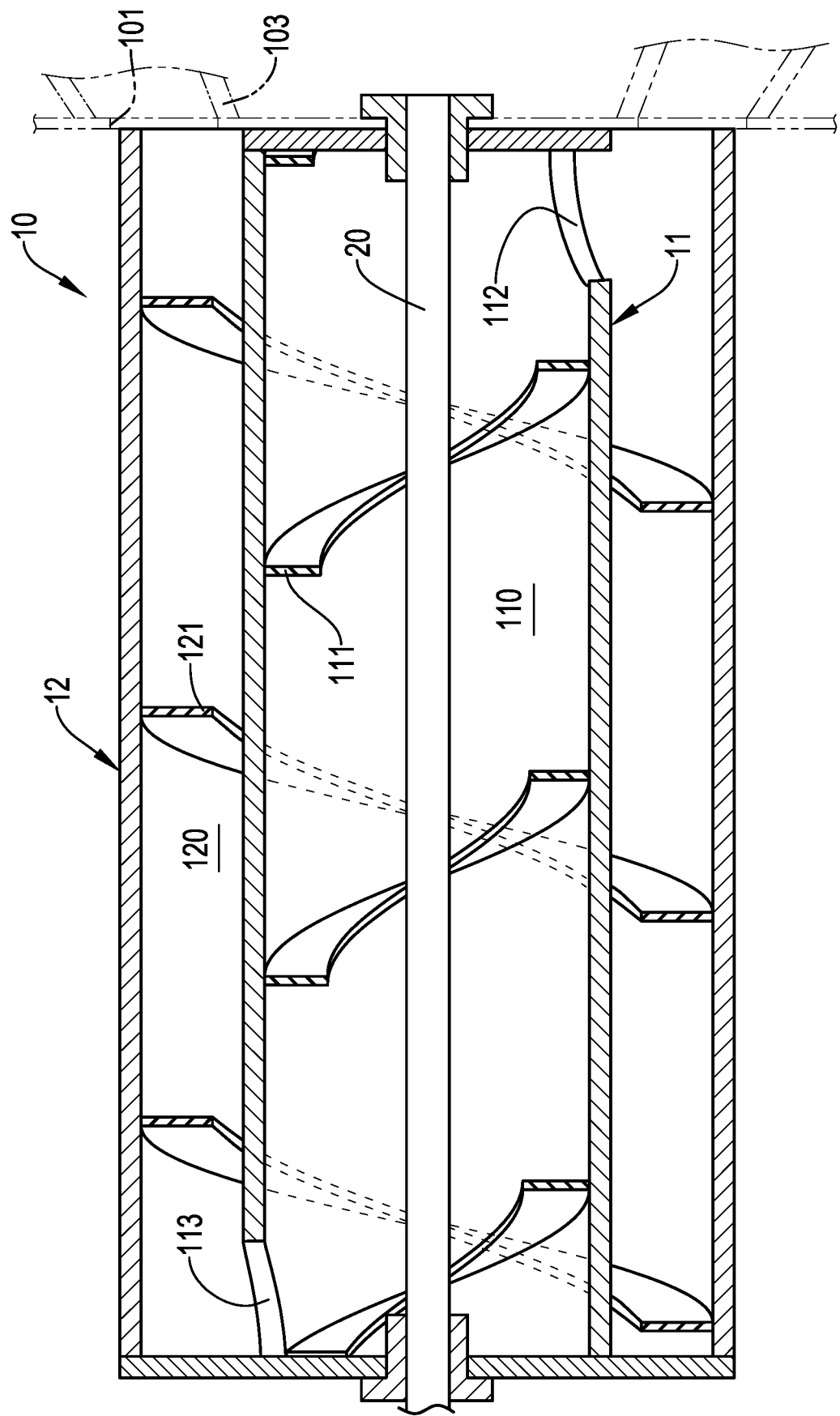
FIG. 3 is a cross-sectional side view of the roasting drum in FIG. 2.

With reference to FIGS. 1 to 3, the multiple drums of the main body 10 are implemented as two in amount. The two drums are a first drum 11 and a second drum 12 respectively. The first drum 11 has two opposite ends, a first inner surface, a first space 110, a first blending blade 111, an entrance 112, and an exit 113. The two opposite ends of the first drum 11 are disposed along the rotating axis X of the main body 10. The first space 110 is disposed inside the first drum 11.

The first blending blade 111 is fixed on the first inner surface of the first drum 11 and spirally extends at least 540 degrees along the first inner surface of the first drum 11. In the embodiment of the present invention, the first blending blade 111 spirally extends at least 540 degrees along the first inner surface of the first drum 11. The first blending blade 111 has two opposite terminal ends. The two opposite terminal ends of the first blending blade 111 respectively extend to the two opposite ends of the first drum 11. The entrance 112 and the exit 113 are defined through the first inner surface of the first drum 11. The entrance 112 and the exit 113 are respectively adjacent to the two opposite terminal ends of the first blending blade 111.

The second drum 12 is mounted around the first drum 11 and is fastened to the first drum 11. The first drum 11 and the second drum 12 are able to rotate together. The second drum 12 has two opposite ends, a second inner surface, a second space 120, and a second blending blade 121. The two opposite ends of the second drum 12 are disposed along the rotating axis X of the main body 10. The second space 120 is disposed between the first drum 11 and the second drum 12. The second space 120 communicates with the inlet 101 and the outlet 102 of the main body 10.

The second blending blade 121 is fixed on the second inner surface of the second drum 12 and spirally extends at least 540 degrees along the second inner surface of the second drum 12. In the embodiment of the present invention, the second blending blade 121 spirally extends at least 540 degrees along the second inner surface of the second drum 12. The second blending blade 121 has two opposite terminal ends. The two opposite terminal ends of the second blending blade 121 respectively extend to the two opposite ends of the second drum 12.

The shaft 20 passes through a middle portion of the first drum 11 of the main body 10 and is fastened to the first drum 11 of the main body 10. The driving device 30 is connected to the shaft 20 and drives the shaft 20 to rotate. The driving device 30 may be an electrical motor. Structures of the shaft 20 and the driving device 30 are not restricted, as long as the main body 10 is rotatable. The shaft 20 may even be omitted.

Figure 4:
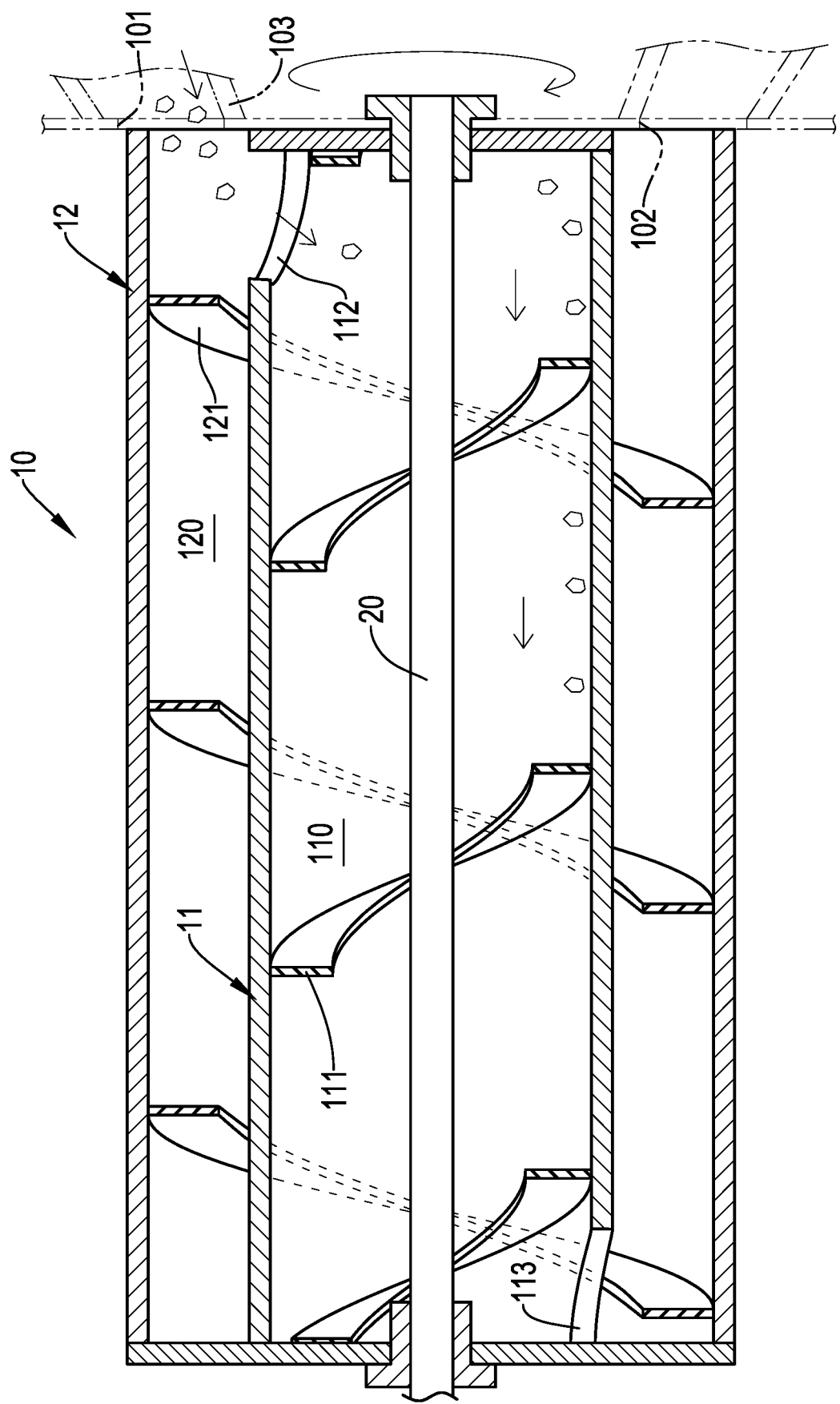
FIG. 4 is an operational and cross-sectional side view of the roasting drum in FIG. 2, showing coffee beans dropping into a second drum.
Figure 5:
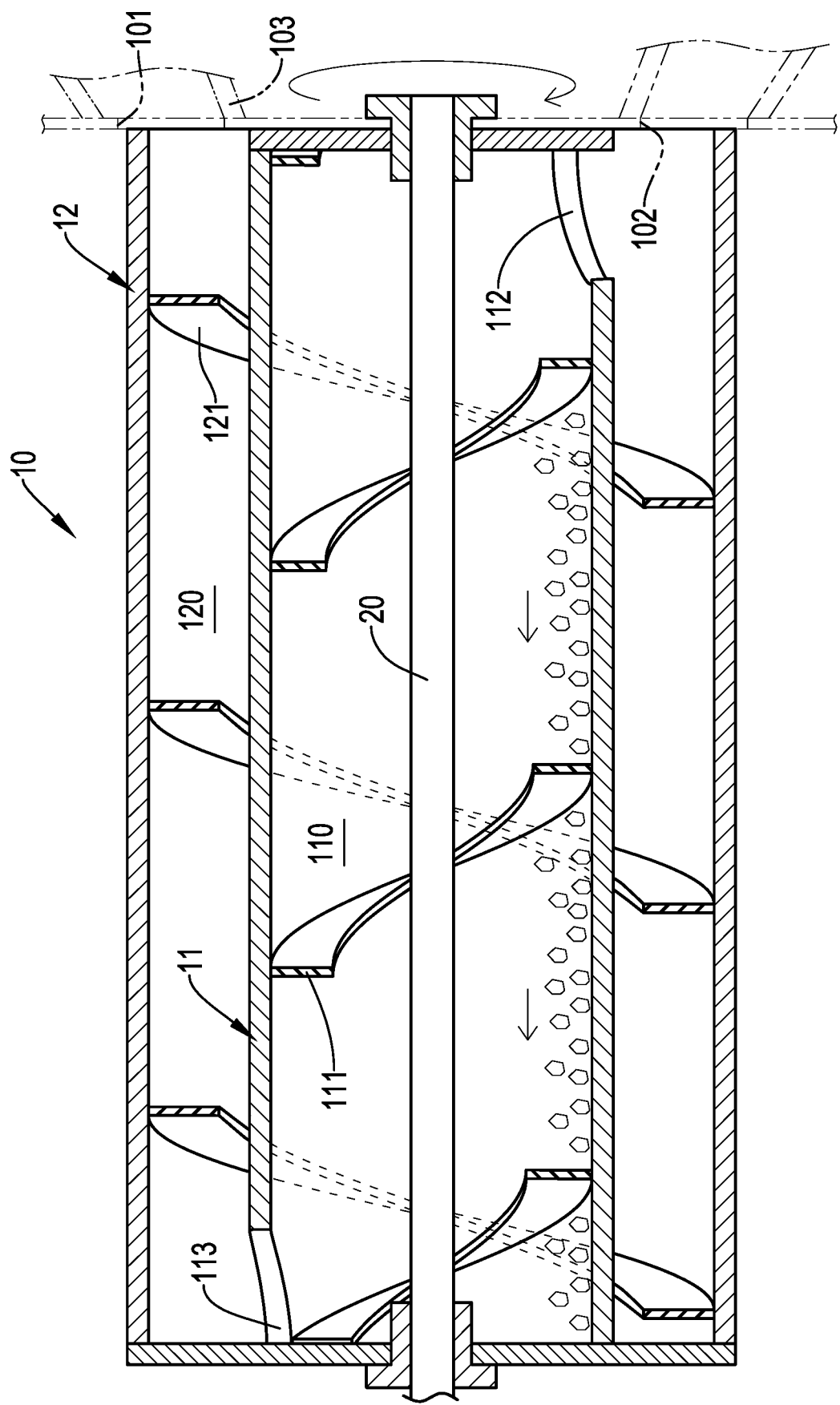
FIG. 5 is an operational and cross-sectional side view of the roasting drum in FIG. 2, showing the coffee beans inside a first drum blended by a first blending sheet.

With reference to FIGS. 1, 4, and 5, the main body 10 is assembled on the roaster. The main body 10 may be disposed obliquely or horizontally. The inlet 101 is positioned below a hopper 103. The driving device 30 is disposed adjacent to the second end of the main body 10. The driving device 30 drives the shaft 20 to make the first drum 11 and the second drum 12 of the main body 10 rotate.

Figure 6:
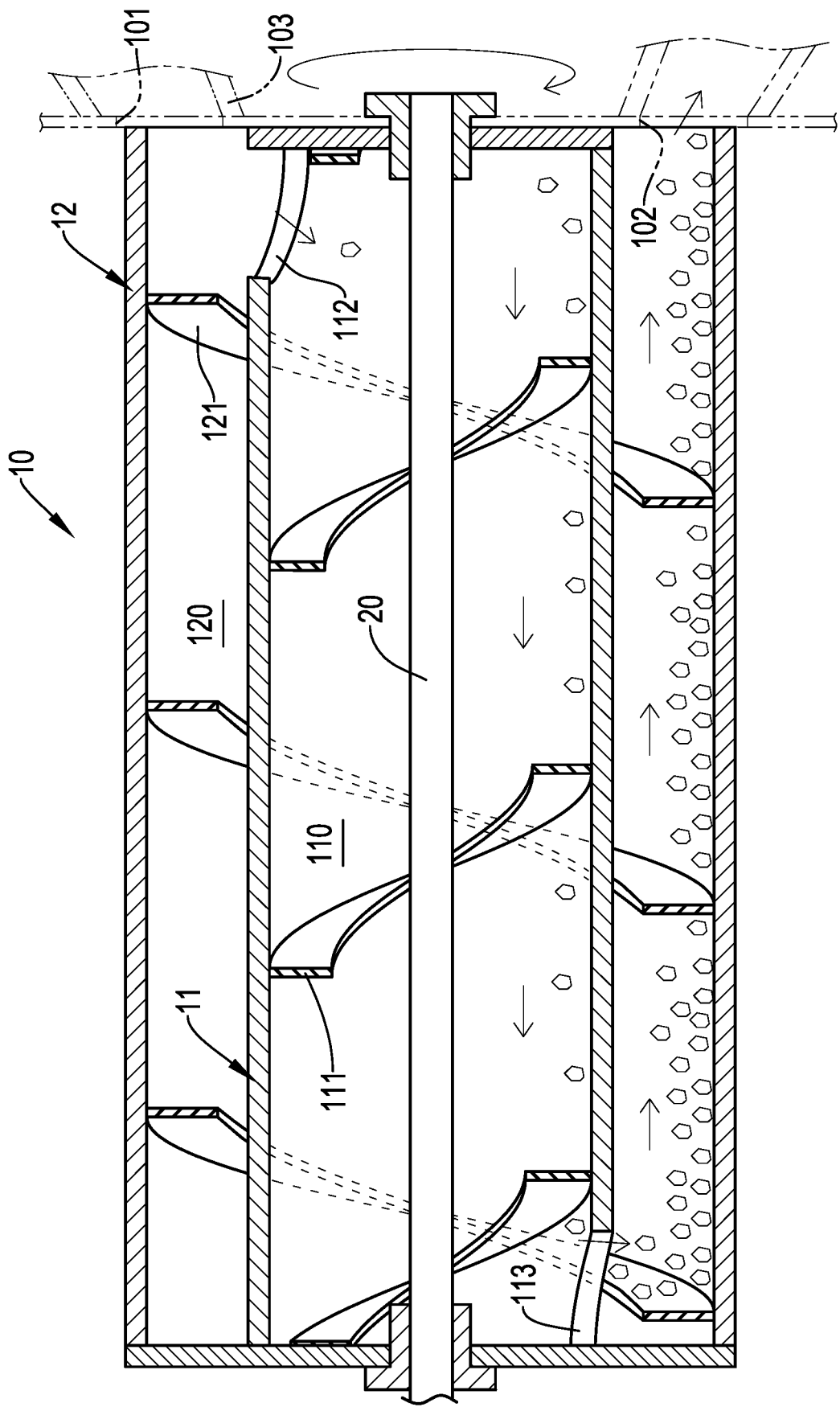
FIG. 6 is another operational and cross-sectional side view of the roasting drum in FIG. 2, showing the coffee beans dropping into the second drum from the first drum and blended by the second blending sheet.

With reference to FIGS. 4 to 6, coffee beans drop into the second space 120 of the second drum 12 via the hopper 103. Then, the coffee beans move along the second blending blade 121 of the second drum 12 and pass through the entrance 112 of the first drum 11. The driving device 30 drives the shaft 20 to make the first drum 11 and the second drum 12 rotate simultaneously. The coffee beans inside the first space 110 of the first drum 11 are blended by the first blending blade 111 of the first drum 11 and move away from the hopper 103. And then, the coffee beans move to one of the two opposite terminal ends of the first blending blade 111 and pass through the exit 113 into the second space 120 of the second drum 12. The coffee beans are stirred by the second blending blade 121 and move toward the hopper 103. The coffee beans move to one of the two opposite terminal ends of the second blending blade 121 that is adjacent to the hopper 103. The coffee beans pass through the entrance 112 and into the first space 110 again. The coffee beans repeatedly move between the first drum 11 and the second drum 12. Finally, the coffee beans are discharged from the outlet 102 as a heating process is finished.

The coffee beans are blended by the first blending blade 111 of the first drum 11 and the second blending blade 121 of the second drum 122, making the coffee beans not only move, but also stirred by the first blending blade 111 and the second blending blade 121. As the coffee beans are sufficiently blended, stirred, and evenly heated, heating quality and taste of the coffee beans are promoted.

The roasting drum in accordance with the present invention is not only applied to coffee roasters, but is also applied to roasters for roasting heated goods such as chestnuts, peanuts, sesame seeds, and almond, etc.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A roasting drum comprising:
   a main body having
   a rotating axis;
   a first end;
   a second end disposed opposite the first end of the main body along the rotating axis of the main body; and
   multiple drums disposed along the rotating axis of the main body, mounted around one another in sequence, fastened to one another, and communicating with one another;
   each one of the multiple drums having
   an inner surface; and
   a blending blade formed on the inner surface;
   the blending blade being spiral and extending from the first end of the main body toward the second end of the main body;
   the blending blade of one of the multiple drums spirally extends along a clockwise direction from the first end of the main body toward the second end of the main body;
   the blending blade of another one of the multiple drums disposed within said one of the multiple drums that has the blending blade extending along the clockwise direction and spirally extending along a counter-clockwise direction from the first end of the main body toward the second end of the main body; and
   at least one opening disposed on the main body; wherein
   the multiple drums of the main body are two in amount;
   the two drums are a first drum and a second drum;
   the first drum has
   a first inner surface; and a first blending blade fixed on the first inner surface of the first drum; and
a first space disposed inside the first drum;
the second drum is mounted around the first drum and has a second inner surface; and
a second blending blade fixed on the second inner surface of the second drum; and
a second space disposed between the first drum and the second drum; and
the first blending blade has two opposite terminal ends;
the first drum has
an entrance defined through the first inner surface of the first drum and communicating with the first space of the first drum and the second space of the second drum; and
an exit defined through the first inner surface of the first drum and communicating with the first space of the first drum and the second space of the second drum;
the entrance and the exit are respectively adjacent to the two opposite terminal ends of the first blending blade.

2. The roasting drum as claimed in claim 1, wherein
the first drum has two opposite ends;
the two opposite terminal ends of the first blending blade respectively extend to the two opposite ends of the first drum;
the second drum has two opposite ends; and
the second blending blade has two opposite terminal ends respectively extending to the two opposite ends of the second drum.

3. The roasting drum as claimed in claim 2, wherein
the first blending blade spirally extends at least 540 degrees along the first inner surface of the first drum; and
the second blending blade spirally extends at least 540 degrees along the second inner surface of the second drum.

4. The roasting drum as claimed in claim 3, wherein a shaft passes through a middle portion of the first drum of the main body and is fastened to the first drum of the main body; the shaft is connected to a driving device.

5. The roasting drum as claimed in claim 1, wherein
the first blending blade spirally extends at least 540 degrees along the first inner surface of the first drum; and
the second blending blade spirally extends at least 540 degrees along the second inner surface of the second drum.

6. The roasting drum as claimed in claim 1, wherein a shaft passes through a middle portion of the first drum of the main body and is fastened to the first drum of the main body; the shaft is connected to a driving device.

* * * * *